United States Patent Office 3,506,697
Patented Apr. 14, 1970

3,506,697
PROCESS FOR THE PRODUCTION OF IRON-CONTAINING COMPLEX DYESTUFFS
Walter Scholl, Cologne-Stammheim, Germany, assignor to Farbenfabriken Bayer Aktiengesellschaft, Leverkusen, Germany, a corporation of Germany
No Drawing. Filed Mar. 15, 1968, Ser. No. 713,313
Claims priority, application Germany, Mar. 25, 1967, F 51,936
Int. Cl. C07j 15/02
U.S. Cl. 260—439    3 Claims

ABSTRACT OF THE DISCLOSURE

Iron-containing complex dyestuffs obtained by the reaction of o-oxynitroso compounds with salts of 2- or 3-valent iron.

---

The object of the present application comprises a process for the production of iron-containing complex dyestuffs by the reaction o-oxynitroso compounds with iron-yielding compounds, characterised in that iron-yielding compounds are allowed to act upon o-oxynitrosonaphthalene compounds of the general formula

I

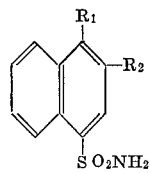

in which $R_1$ and $R_2$ stand for a hydroxyl group or for a nitroso group, but cannot simultaneously denote identical radicals.

Suitable compounds of the Formula I are 1-oxy-2-nitroso naphthalene-4-sulphonamide and 1-nitroso-2-oxy-naphthalene-4-sulphonamide, the use of the first-mentioned compound being preferred.

In each case the oxynitroso formulae are given; but it is self-evident that these may be replaced by the tautomeric o-quinone-monoxime formulae.

The compounds of the Formula I can be prepared according to known methods: 1-oxy-2-nitrosonaphthalene-4-sulphonamide, for example, by the reaction of 1-oxy-naphthalene-4-sulphonamide with nitrous acid.

Simple salts of 2- or 3-valent iron may be used as metal yielding agents, with or without addition of materials promoting the complex formation. Such agents promoting the complex formation are, for example, tartaric acid, citric acid, salicylic acid or their salts, or other compounds which are capable of preventing precipitation of the metal hydroxides in weakly acidic, neutral or alkaline media. Since these materials are themselves complex-forming agents, their complex compounds with the metals concerned can directly be used as metal-yielding agents.

The transformation of the dyestuffs into the complex metal compounds is advantageously carried out hot and, if desired, in the presence of suitable additives. As such additives dispersing substances may be used, furthermore acid-binding materials, such as sodium hydroxide, sodium carbonate, sodium bicarbonate, sodium acetate, ammonia, alkylamines, pyridine, and, finally, organic solvents.

In this way, there are obtained deep-coloured iron complex compounds containing per each metal atom three components corresponding to the above formulae.

It is self-evident that mixtures of 1-oxy-2-nitroso-naphthalene-4-sulphonamide and 1-nitrose-2-oxy-naphthalene-4-sulphonamide can also be converted into the mixed iron complexes. It is expedient to proceed in such a manner that a mixture of 1-hydroxy-naphthalene-4-sulphanamide and 2-hydroxy-naphthalene-4-sulphonamide is nitrosited with nitrous acid, and the nitrosited mixture reacted with iron-yielding agents without separation.

The new dyestuffs are suitable for the dyeing and printing of materials of the most varied type, but particularly for the dyeing and printing of fibre materials of synthetic superpolyamides and superpolyurethanes. Dyeing is advantageously carried out in a weakly alkaline or neutral to weakly acidic bath, e.g. in an acetic acid bath. The dyeing thus obtainable exhibit excellent fastness properties.

EXAMPLE 1

22.3 parts by weight 1-hydroxy-naphthalene-4-sulphonamide are dissolved in 150 parts by volume of water and 11.5 parts by volume of a 40% sodium hydroxide solution, followed by the addition of 23 parts by volume of a 30% sodium nitrite solution. This solution is allowed to run into a mixture of 90 parts by volume of water, 140 parts by weight of ice and 23 parts by volume of concentrated hydrochloric acid, and further stirred at 0–5° C. for 3 hours. Excess nitrite is then destroyed with amidosulphonic acid, and the reaction mixture adjusted to pH 4.0 with a small amount of a 40% sodium hydroxide solution. It is then diluted with 230 parts by volume of water, 10.4 parts by weight iron (II)-sulphate ($FeSO_4 \cdot 7H_2O$) are added, and 50 parts by volume of a 20% sodium acetate solution are allowed to run in. The reaction mixture is then heated at 60° C. for 30 minutes and the pH value maintained at pH 5.0 by the gradual addition of 7.7 parts by volume of a 40% sodium hydroxide solution. The precipitated iron complex dyestuff is then filtered off with suction at 60° C. and dried at 40° C. in a vacuum.

The dyestuff is a dark powder which dyes polyamide fibres in clear, fast green shades.

EXAMPLE 2

22.4 parts by weight 2-hydroxy-naphthalene-4-sulphonamide are dissolved in 170 parts by volume of formamide, the solution is mixed with 27 parts by volume of 30% hydrochloric acid and cooled to 5° C. with a small amount of ice. 22.8 parts by volume of a 30% nitrite solution are then added dropwise and stirring is continued at 10–15° C. for 2 hours. Excess nitrite is destroyed with a little amidosulphonic acid. 11.7 parts by weight iron (II)-sulphate ($FeSO \cdot 7H_2O$) are introduced and, after 15 minutes, 14 parts by weight sodium acetate ($CH_3COONa \cdot 3H_2O$)

are added. After stirring for 2 hours at 20° C., the reaction mixture is introduced into 700 parts by volume of water and 35 parts by weight of sodium chloride. The precipitated iron complex dyestuff is filtered off with suction and dried at 50° C. in a vacuum. A dark powder is obtained which dyes polyamide fibres in fast olive shades.

EXAMPLE 3

0.03 g. of the iron complex described in Example 1 are dissolved in 5 ml. dimethyl formamide and, after the addition of 0.5 g. of an alkyl-aryl-polyglycol ether, introduced into 200 ml. of water and 0.25 g. of an alkyl-polyglycol ether. 5 g. polyamide fibres are introduced into this dyebath at 40° C., the temperature is raised to 100° C. in the course of 30 minutes and boiling is subsequently continued for 30 minutes. There are then added, referred to the weight of the material, 2% of a 30% acetic acid, and boiling is continued for 1 hour. The material is subsequently rinsed first hot and then cold, and dried.

A clear green dyeing of good fastness properties is obtained.

I claim:
1. Process for the production of iron-containing complex dyestuffs by the reaction of o-oxynitroso compounds with iron-yielding agents, characterised in that salts of 2- or 3-valent iron are allowed to act upon o-oxynitrosonaphthalene compounds of the formula

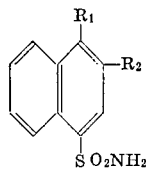

in which $R_1$ and $R_2$ stand for a hydroxyl group or a nitroso group, but cannot simultaneously denote identical radicals.

2. Processing according to claim 1, characterised in that salts of 2- or 3-valent iron are allowed to act upon 1-oxy-2-nitroso-naphthalene-4-sulphonamide.

3. Iron-containing complex dyestuffs obtainable by the action of salts of 2- or 3-valent iron upon o-oxynitrosonaphthalene compounds of the formula

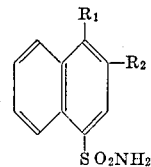

in which $R_1$ and $R_2$ stand for a hydroxyl group or for a nitroso group, but cannot simultaneously denote identical radicals.

References Cited

UNITED STATES PATENTS 2,891,951   6/1959   Strobel et al. _____ 260—242
3,051,750   8/1962   Dettwyler _____ 260—556

TOBIAS E. LEVOW, Primary Examiner

A. P. DEMERS, Assistant Examiner

U.S. Cl. X.R.

8—55; 106—288; 260—556